United States Patent [19]

Scarpatetti et al.

[11] Patent Number: 4,888,454
[45] Date of Patent: Dec. 19, 1989

[54] CURRENT SUPPLY SYSTEM FOR TRACK-GUIDABLE, RUBBER-TIRED, ELECTRICALLY PROPULSIVE VEHICLES

[75] Inventors: Diether V Scarpatetti, Esslingen; Dietrich Sahm, Bad Urach, both of Fed. Rep. of Germany

[73] Assignee: Daimler-Benz AG, Stuttgart, Fed. Rep. of Germany

[21] Appl. No.: 204,257

[22] Filed: Jun. 9, 1988

[30] Foreign Application Priority Data

Jun. 9, 1987 [DE] Fed. Rep. of Germany ....... 3719213

[51] Int. Cl.$^4$ ............................................. B60M 1/04
[52] U.S. Cl. ........................................ 191/30; 191/31; 191/23 R
[58] Field of Search ................... 191/30, 31, 35, 22 C, 191/32, 23 R; 238/379; 246/9, 11, 65, 67, 69

[56] References Cited

U.S. PATENT DOCUMENTS

| 553,799 | 1/1896 | Wood | 191/23 R |
| 1,805,572 | 7/1927 | Mask | 191/23 R |
| 2,086,611 | 7/1937 | Frank | 191/23 R |

FOREIGN PATENT DOCUMENTS

| 2739482 | 3/1979 | Fed. Rep. of Germany | 191/30 |
| 1566377 | 5/1969 | France | 191/35 |
| 0027109 | 3/1977 | Japan | 191/30 |
| 0279147 | 12/1987 | Japan | 191/23 R |
| 69836 | 11/1951 | Netherlands | 191/23 R |
| 7127 | of 1890 | United Kingdom | 191/23 |

OTHER PUBLICATIONS

"Transportation System-Dashaveyor People Mover", Brochure of Bandix-Dashaveyor Company.

Primary Examiner—Andres Kashnikow
Assistant Examiner—Mark T. Le
Attorney, Agent, or Firm—Barnes & Thornburg

[57] ABSTRACT

The invention relates to a ground-level multipole current supply system for track-guidable, rubber-tired, electrically propulsive vehicles, wherein extruded aluminum profiles are provided within an electrically insulating duct-like shielding for each pole. To permit the current supply system to be kept small and easily installable the shielding is constructed as a self-supporting extruded profile which is fastened, suspended with ducts open downwards, on support arms. The substantially triangular live rails are retained screwlessly by sliding axially behind beads in the shielding. A vee-shaped arrangement of the contact tracks of the two live rails and of the two contact pieces on the current collector side exerts a self-centering influence upon the current collector head, so that the latter can be of simple construction and only little play need be provided for relative movements between current collector head and live rails.

11 Claims, 4 Drawing Sheets

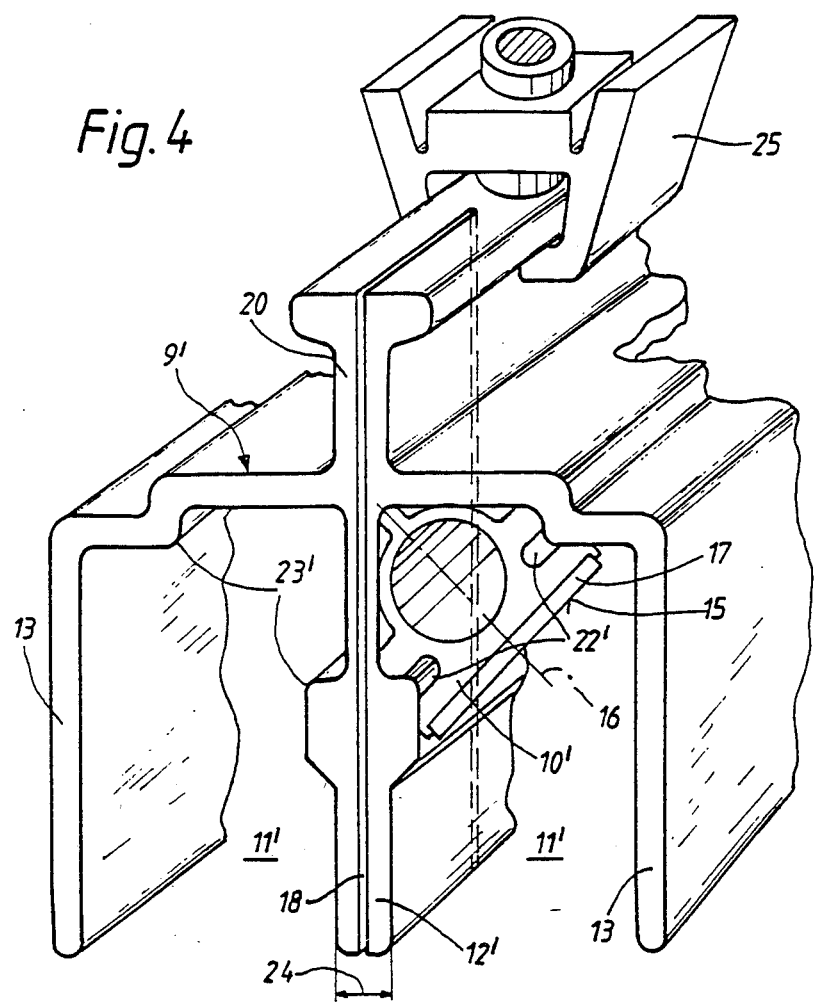
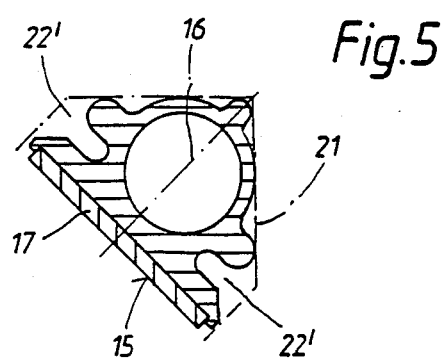

CURRENT SUPPLY SYSTEM FOR TRACK-GUIDABLE, RUBBER-TIRED, ELECTRICALLY PROPULSIVE VEHICLES

BACKGROUND AND SUMMARY OF THE INVENTION

The invention relates to a ground-level multiple current supply system for track-guidable, rubber-tired, electrically propulsive vehicles of the general type known, for example, from the Bendix Dashaveyor Company's brochure entitled "Transportation System—Dashveyor People Mover". This brochure describes in detail a local transportation system proposed for installation at the "Dulles" International Airport in the American capital city of Washington in 1972.

For the current supply system of these track-guidable vehicles, a total of four live rails are arranged vertically superposed above the transverse guide bars, and are respectively independently contactable by means of a current collector arm. The live rails have a double tee-shaped profile; the wear-reducing lining consists of a graphite coating. Each individual rail is shielded upwards and towards the side wall by an L-shaped angle profile consisting of plastic; the mutually adjacent angle profiles produce for each individual live rail a shielding duct open towards the vehicle but closed on three sides. The contact sides of the different live rails are located vertically and vertically below each other all in one plane. To permit height tolerances of the current collectors on the vehicle side relative to the live rails on the carriageway side to be compensated, the brushes of the current collectors are wider in the vertical direction than the contact track of the live rails. Consequently, it is also necessary for the shielding ducts in which the live rails are located to be constructed wider upwards and downwards for a height deviation. The current supply system is therefore relatively voluminous. The shielding means is open towards the side over a large area, so that the live rails have little protection from dampness due to the weather and from contact from man or beast. A further disadvantage lies in the relatively onerous fastening means of the live rails. For this purpose it is first of all necessary for a large number of vertically positioned insulator posts to be fastened consecutively to the insides of the through-shaped carriageways, to which, in turn, the live rails and the shielding profiles are then screwed. This not only involves a large consumption of materials; the assembly also demands a very large number of man-hours, so that the current supply system becomes extremely expensive overall.

An object of the invention is to improve the current supply system of the type mentioned above so that the current supply system has a smaller cross-section, that it is better protected against wetness due to the weather and against contact, and that it can be installed more simply and more rapidly and is therefore cheaper than known current supply systems.

This object is achieved according to the invention by providing that:
  (a) the shielding means is constructed for two live rails as a homogeneous self-supporting extruded profile with a pair of ducts, open downwards in the installation position, on the other side of which an appropriate fastening profiling, for suspended fastening to support arms is integrated;
  (b) the cross-section of the live rails exhibits a substantially triangular or pentagonal-house-like envelope contour whilst the live rails are arranged with their contact sides mutually inclined in immediate proximity of the partition within the shielding means; and
  (c) longitudinal grooves or beads are formed on both sides of the live rails and correspondingly complementary beads or longitudinal grooves on the insides of the ducts of the shielding means are provided which interlock mutually positively and in barb fashion so that the live rails are slidable axially into the shielding means but are immediately retained firmly therein transversely to the slide-in direction.

By virtue of the self-supporting and structurally integrated conformation of the shielding means as an extruded profile, the live rails, likewise constructed as an extruded profile, can be maintained securely therein by axial sliding in without screwing. By virtue of the suspended arrangement of the shielding means, the latter can be suspended swinging as a self-supporting beam from a small number of support points, whilst the assembly proceeds extremely rapidly. Better protection from wetness and contact is also created by the suspended shielding means open underneath. By virtue of the v-shaped arrangement of the contact tracks, a centering characteristic is obtained for the two current collector brushes on the vehicle side, so that no corresponding clearance need be provided within the shielding means for relative movements between the live rail on the carriageway side and the current collector brush on the vehicle side. Consequently the shielding means can be kept relatively small in cross-section, which favours not only the overall volume, but also the investment costs.

Other convenient further developments of preferred embodiments of the invention include constructing the shielding means of glass fiber-reinforced plastic, providing a thick wall in the region over hanging the live rails, and disposing the contact rails with v-shaped contact sides. Preferred embodiments also provide the live rails with a hollow profile having a circular cross-section.

Other objects, advantages and novel features of the present invention will become apparent from the following detailed description of the invention when considered in conjunction with the accompanying drawings.

BRIEF DESCRIPTION OF THE DRAWINGS

FIG. 4 shows another exemplary embodiment of a current supply system in an incompletely assembled state; and FIG. 5 shows a cross-section of a live rail for the current supply system according to FIG. 4.

DETAILED DESCRIPTION OF THE DRAWINGS

Figure 1:
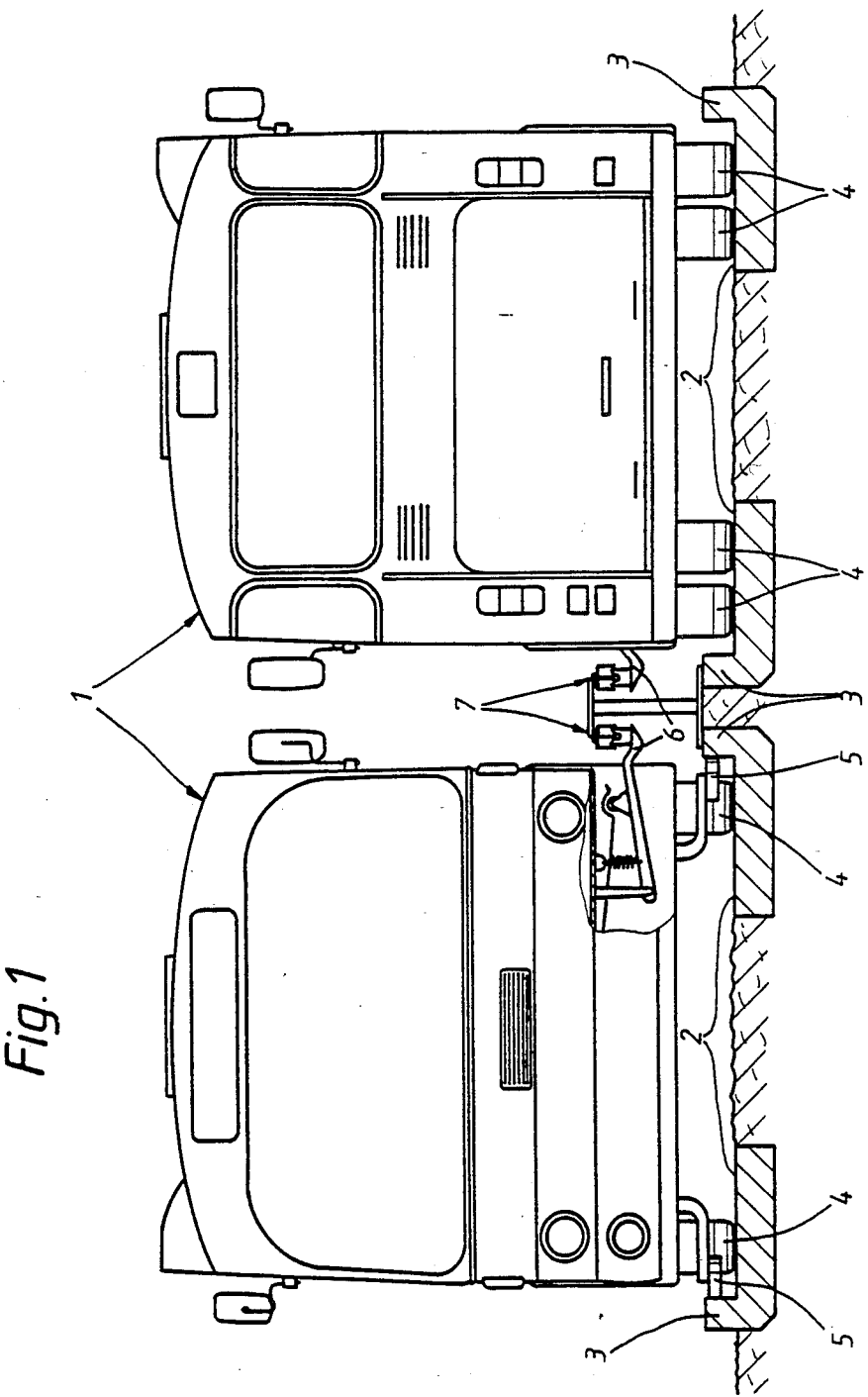
FIG. 1 shows a cross-section through a double-tracked track-guiding carriageway with track-guidable omnibuses located thereon, constructed in accordance with a preferred embodiment of the invention.
Figure 2:
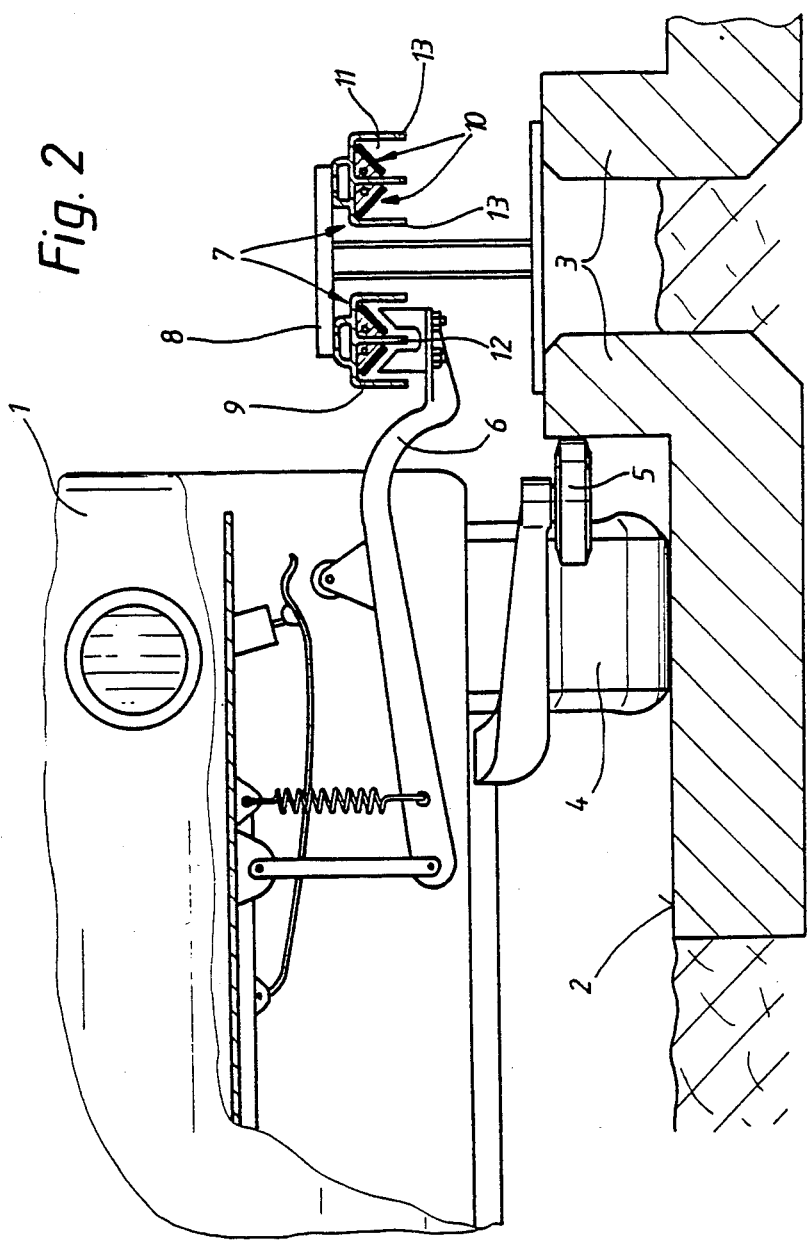
FIG. 2 shows a larger scale individual view of the current collector part of a vehicle according to FIG. 1 including the current supply system.

FIG. 1 shows two omnibuses 1, which meet on a double-tracked track-guiding carriageway 2. The omnibuses are provided with transverse guide rollers 5 in the region of the front steerable vehicle wheels 4. The transverse guide rollers 5 cooperate with transverse guide bars 3 on the carriageway side, which control the travel direction of the vehicle wheels 4.

The carriage-ways 2 are provided with a ground-level current supply system 7 to supply current to the electrical propulsion system of the vehicles; corresponding extensible current collector arms 6 are provided on the vehicle side, which in the extended state can yield in the vertical direction and in the horizontal direction and can follow the course of the live rails exactly by virtue of a prismatic configuration of the contact tracks of the live rails and of a correspondingly complementarily conformed likewise prismatic construction of the contact pieces 14 of the current collector brushes. Only possible rolling movements of the vehicle, which are also transmitted to the contact pieces 14, lead to relative displacements and/or relative rotations relative to the live rails; the contact pieces 14 will therefore enter the abutment region convexly.

Figure 3:
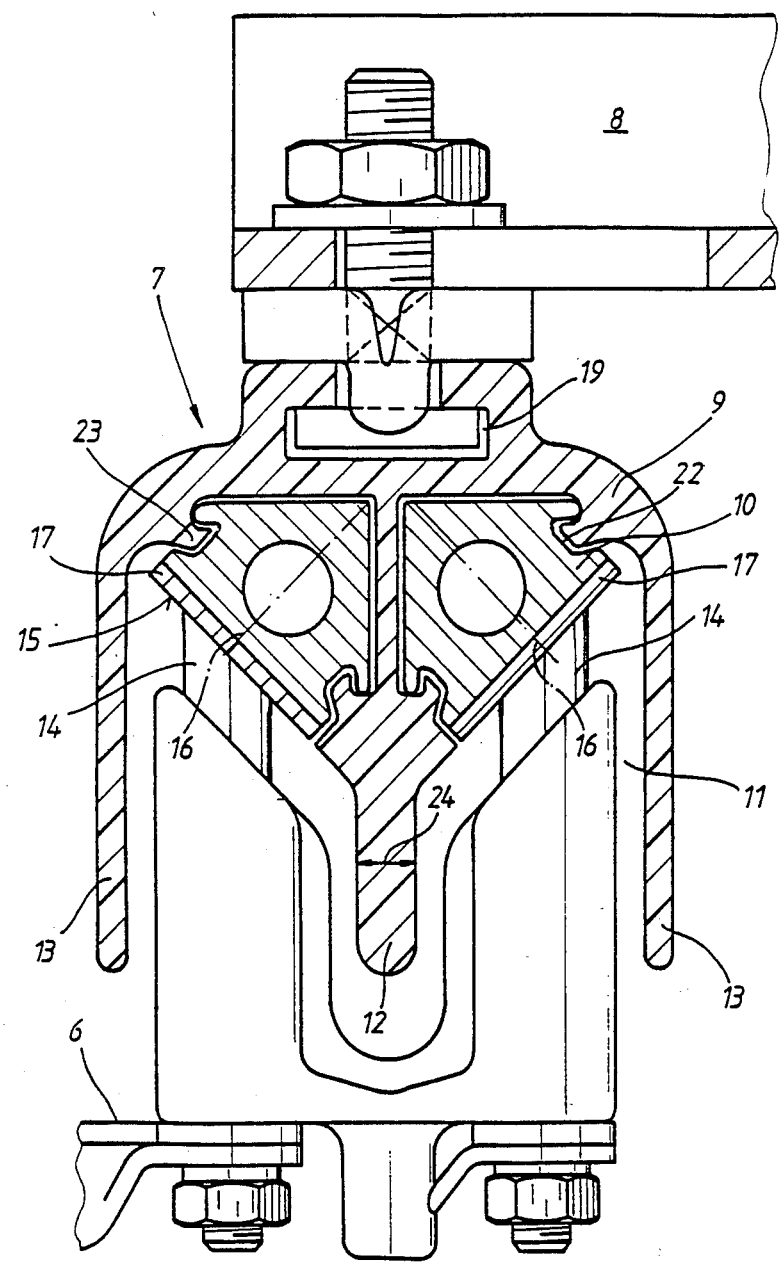
FIG. 3 shows an individual view on a still larger scale of a two-pole current supply system and of the carbon brushes of the current collector for the arrangement of FIGS. 1 and 2.

The current supply system 7, shown in cross-section on a much larger scale in FIG. 3, comprises a shielding means 9 made of plastic suspended swinging from the retaining arm 8 and constructed as a self-supporting homogenous extruded profile. The term extruded profile is intended to mean that the shielding means 9 exhibits the same cross-section consecutively at all points along its length. The shielding means 9 preferably consists of glass fiber-reinforced plastic, which further increases its strength. In addition to good load bearing capacity, a high electrical insulation capacity and aging resistance are also important for the material. The shielding means should not become brittle or cracked even after many years in an outdoor environment.

The shielding means forms, with the two outer walls 13 and a partition wall 12, two ducts 11 which are open downwards and otherwise entirely closed. A tee-groove 19 is shaped on the top side of the shielding means in the exemplary embodiment illustrated in FIG. 3 whereby the shielding means may be fastened suspended from the support arms 8 in a simple manner by means of hammer-head screws.

A live rail 10 is slid axially into each of the individual ducts 11 of the shielding means 9. The live rails are produced as a extruded profile from aluminum and constructed symmetrically in cross-section to respective lines of symmetry 16. The contact side 15 of the live rail is protected against wear and against rust and other corrosion by a lining 17 of stainless steel.

The live rails 10 exhibit a substantially triangular or pentagonal-house like envelope contour 21 (dash lines in FIG. 5) whilst the live rails are arranged within the shielding means in immediate proximity of the partition 12 with their contact sides 15 mutually inclined. The contact sides of the live rails are in fact arranged mutually inclined in a v-shape rising outwards, whilst the angle enclosed by them is approximately 90 degrees. Due to this v-shaped arrangement of the contact sides 15 of the live rails, a self-centering guidance is exerted by the live rails upon the two contact pieces 14 of the current collector. By virtue of the v-shaped arrangement of the contact side 15 of the live rails, the two contact pieces 14 can be attached mutually rigidly to one and the same current collector arm 6, which represents a simplification of the current collector and its components and a simplification of maintenance. In the case of angular displacements of the current collector head relative to the live rails caused by rolling, both contact pieces 14 nevertheless remain in current-transmitting contact with the contact sides 15 by virtue of the self-centering property of the v-shaped arrangements. The one contact piece 14 simply slides up relative to the normal position on the associated contact side 15, and the other one correspondingly down. This advantage is obtained both in the case of the illustrated v-shaped arrangement, and of an inverse, that is to say falling downwards, roof-shaped arrangement of the contact sides 15. In the case of the arrangement with the contact sides 15 rising outwards, as illustrated in FIGS. 3 and 4, the introduction of the contact pieces 14 into the individual ducts is facilitated compared to an inversely arranged inclined position of the contact sides 15, because the partition 12 overhanging in the center finds its way more easily between the two contact pieces 14 bevelled in v-shape.

For a screwless fastening of the live rails within the shielding means, the live rails 10 respectively exhibit longitudinal grooves 22 on both sides symmetrically to the line of symmetry 16 and the shielding means 9 exhibits a respective pair of beads 23 at corresponding points. The longitudinal grooves 22 and the beads 23 interlock positively in barb fashion and keep the axially inserted live rails securely from falling out. The shielding means 9 and the live rails 10 will expediently be produced in equal length sections and slide into each other, however the joints between adjacent shielding means on the one hand and the joints between mutually adjacent rails in the longitudinal direction on the other hand are mutually offset in the longitudinal direction. As a result, the shielding means and the live rails can mutually center themselves at the joint positions. At the joint positions of the shielding means, the latter is expediently protected against leakage currents, flash-overs and against wetness, dust and incrustation by a cuff in the external region and by a vertical tongue and groove construction in the region of the partition 12 (see groove 18 in FIG. 4). At the joint positions of the live rails a current transfer cable is embedded in the interior of the hollow profile, which is the subject of another patent application by the applicants, Ser. No. 204,617 filed June 9, 1988 (now U.S. Pat. No. 4,820,168), based on German Application No. P 37 19 214.0 filed June 9, 1987 in Germany. The internal contour of the hollow profile is conveniently of circular cross-section, so that the cable shoes on the current transfer cables can be constructed as corresponding plug pins.

By virtue of the screwless fastening of the live rails within the shielding means, the latter can be housed simply and with space economy therein, whilst the shielding means 9 and the installed live rails 10 form a self-supporting unit which need be suspended only from a few support arms 8 arranged at intervals. The fastening means and/or screws used for this purpose, like the hammer-head screws already mentioned, engage the shielding means and insulation externally and do not come dangerously close to live parts. By virtue of the downward directed aperture of the ducts 11 an effective protection against wetness and contact is also created, particularly since the open side of the ducts is relatively narrow and the live parts are accordingly located in a deep depression.

In order for the self-supporting shielding means to be as flexurally rigid in the vertical direction as possible, and to be able to support the live rails with the least possible sag and long bracing interval, the angular impulse of the cross-section of the shielding means must be as high as possible. This purpose is also served by the relatively great vertical extension of the outer walls 13 and of the partition 12. A minimum possible sag is important in the case of high travel speeds of the vehicle, because otherwise the current collector head is excited to vertical oscillations which, in the case of resonance phenomena, may cause the contact pieces 15 to lift from the live rails. In order to make the angular impulse of the shielding means 9 as high as possible, it is expedient to provide accumulations of material in the region of the top side and the bottom side. For this reason, the two angular profile bars forming the tee-shaped groove 19 are shaped on the top side, constituting a corresponding accumulation of material. An accumulation of material effective in this sense is achieved in the region of the under side in that the partition 12 is constructed thicker (dimension 24) in the region of its overhanging end than the remaining wall thicknesses of the shielding means. However, the thickening of the wall of the partition in the lower region also has another purpose besides this: the part of the partition 12 overhanging relative to the live rails 10 engages contactlessly into a corresponding recess of the current collector head; a certain emergency guidance of the current collector head along the shielding means is produced by this means for the case of a temporary lifting of the current collector head from the live rails.

In the exemplary embodiment of the shielding means 9' and/or of the live rails 10' illustrated in FIGS. 4 and 5, the same reference numerals (but primed) are used to designate parts of similar function but different shape, so that reference may be made to the preceding description to a large extent. In the region of the top side side of the shielding means 9', a tee-shaped flange 20 is provided instead of a tee-shaped groove for the suspended fastening to a series of support arms. The live rails 10' have a smaller material cross-section and are correspondingly lighter. The beads 23' in the region of the inside of the ducts 11' are simply formed by right-angled projections. This renders the cross-section of the shielding means 9' simpler. In Figure 4, a special nut 25 to be slid axially onto the tee-shaped profile of the tee-shaped groove is also illustrated, and is produced as an extruded profile from aluminum with pressed-in screw thread insert. The side walls connected by narrow connecting webs acting in film hinge fashion perform the function of claw plates which engage and clamp behind the head of the tee-shaped profile when the nut is tightened.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Ground-level multiple current supply systems for track-guidable, rubber-tired, electrically propulsive vehicle, comprising:
   live rails and current collectors for each pole laid following a track close beside a moving path of the vehicle, said live rails each being formed of an extruded aluminum profile of mutually identical cross-section along the length thereof and shaped symmetrically to a line of symmetry of said cross-section, said live rails each exhibiting a flat contact side located at right angles to the line of symmetry and including a wear-reducing lining on the contact side for associating with the current collector on a side of the vehicle;
   shielding means comprising electrically insulating material forming for each live rail a duct having shielding walls closing on three longitudinal sides of said each live rail, at least two live rails disposed adjacent and parallel to one another and the two ducts enclosing the two live rails including a common shielding wall which forms a partition between the two live rails;
   the shielding means being a homogeneous self-supporting extruded profile including pair of ducts open downwards in the installation position for accommodating respective ones of the live rails in the ducts, on the other side of the openings of the ducts, the shielding means including a fastening means for attaching the shielding means to support arms;
   the cross-section of the live rails having a substantially polygonal-house-like shape, the live rails further having the contact sides mutually inclined relative to the common shielding wall;
   longitudinal interengagement means formed on both sides of the live rails and correspondingly complementary interengagement means formed on the insides of the ducts of the shielding means, which the longitudinal and complementary interengagement means interlock mutually positively and in barb fashion so that the live rails are slidable axially into the shielding means but are immediately retained firmly therein transversely to the slide-in direction.

2. Current supply system according to claim 1, wherein the shielding means consists of glass fiber-reinforced plastic.

3. Current supply system according to claim 1, wherein the partition includes a portion adjacent to the opening of the duct being thicker than the remaining portion of the partition.

4. Current supply system according to claim 3, wherein the contact sides of the live rails are arranged mutually inclined in vee-shaped configuration rising outwards.

5. Current supply system according to claim 4, wherein the live rails form a hollow profile having a circular interior boundary cross-section.

6. Current supply system according to claim 2, wherein the live rails form a hollow profile having a circular interior boundary cross-section.

7. Current supply system according to claim 1, wherein the contact sides of the live rails are arranged mutually inclined in vee-shaped configuration rising outwards.

8. Current supply system according to claim 7, wherein the contact sides of the two live rails together enclose an angle of approximately 90 degrees.

9. Current supply system according to claim 1, wherein the longitudinal and complementary interengagement means include respective groove means and bead means.

10. Current supply system according to claim 9, wherein the groove means are provided on the shielding means and the bead means are provided on the live rails.

11. Current supply system according to claim 1, wherein the live rails form a hollow profile having a circular interior boundary cross-section.

* * * * *